(12) United States Patent
Myles et al.

(10) Patent No.: US 9,000,101 B2
(45) Date of Patent: *Apr. 7, 2015

(54) ANHYDRIDE END-CAPPING OF POLYMERS

(71) Applicants: Xerox Corporation, Norwalk, CT (US); National Research Council of Canada, Ottawa (CA)

(72) Inventors: Andrew J. Myles, Edmonton (CA); Jordan H. Wosnick, Toronto (CA); Karen A. Moffat, Brantford (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/938,255

(22) Filed: Jul. 10, 2013

(65) Prior Publication Data

US 2015/0018494 A1    Jan. 15, 2015

(51) Int. Cl.
*C08G 63/08* (2006.01)
*C08G 63/91* (2006.01)
*C08G 64/42* (2006.01)
*C08G 63/664* (2006.01)

(52) U.S. Cl.
CPC ............... *C08G 63/91* (2013.01); *C08G 64/42* (2013.01)

(58) Field of Classification Search
USPC ........... 525/415, 411; 430/108.4, 135, 137.15
See application file for complete search history.

(56) References Cited

U.S. PATENT DOCUMENTS 7,569,641 B2 *   8/2009   Fan et al. .................... 525/331.9
2010/0304287 A1 * 12/2010   Wosnick et al. ........... 430/108.4

OTHER PUBLICATIONS

U.S. Appl. No. 13/938,256, filed Jul. 10, 2013.*

* cited by examiner

*Primary Examiner* — Terressa Boykin
(74) *Attorney, Agent, or Firm* — MDIP LLC

(57) ABSTRACT

The disclosure describes a neat, one-pot scheme for reacting a hydroxyl propagating end of a polymer with a cyclic acid anhydride to form a free acid terminus.

20 Claims, 3 Drawing Sheets

ANHYDRIDE END-CAPPING OF POLYMERS

FIELD

The present disclosure generally is directed to polymer synthesis, and more specifically, to processes for increasing the hydrolytic stability of polymers having a hydroxyl propagating end by reaction with a cyclic acid anhydride to form a free acid end.

BACKGROUND

Ring-opening polymerization (ROP) is an addition polymerization where the terminal end of a polymer acts as a reactive center and cyclic monomers join to form a larger polymer chain. In the case of a polylactide, an alkoxide of a metal having d orbitals, such as, aluminum or tin, is considered an effective initiator for ROP of lactides (see, e.g., Biopolymers from Renewable Resources, Hartmann et al. (eds.), 1998, Spring-Verlag, Berlin, herein incorporated by reference in entirety). Metal-free, purely organic catalysts have been reported using either tertiary amines or phosphines as nucleophilic transesterification catalysts (see, e.g., Nederberg et al., Agnew Chem Int Ed (2001) 40:2712; Nederberg et al., Chem Comm (2001) 2006; and Kamber et al., Chem Rev (2007) 107:5813, herein incorporated by reference in entirety). A more recent class of organocatalysts for ROP are the N-heterocyclic carbenes (NHCs) which have been studied in the polymerization of $\epsilon$-caprolactone to provide polycaprolactones with controlled molecular weight and low polydispersity (see, e.g., Kamber et al., Macromolecules (2009) 42 (5):1634, herein incorporated by reference in entirety). All those processes rely on stringent anhydrous conditions and many involve reactions under pressure with solvent.

Lactide may be copolymerized with a number of different monomers including other lactone monomers, such as, glycolide and caprolactone. Block copolymers of polycaprolactone and polylactide may be prepared in two ways: first, via a sequential addition of the required monomer to the living growing chain end of the first monomer; and the second is by making a prepolymer with a hydroxyl end group to which the second monomer may be added in the presence of a catalyst (see, e.g., Bero et al., Polym Bull (1993) 21:9, and Veld et al., J Polym Sci Part A Polym Chem (1997) 35:219, herein incorporated by reference in entirety).

The reactivity of lactone monomers is much lower than that of lactide monomers which generally proscribes one-pot processes.

A one-pot, neat, organocatalytic ROP process for generating polymers and copolymers, which can be functionalized, was developed. Such polymers and copolymers can be tuned to promote self-assembly into organic biodegradable nanoparticles. However, some compositions, such as those containing a polylactide (PLA) block at the chain end, are susceptible to premature degradation through ring-closing reactions initiated at the hydroxyl terminus.

Thus, what is needed is a method that stabilizes the hydroxyl chain end to provide greater hydrolytic stability, including introducing additional functionalities for particular uses.

SUMMARY

The present disclosure provides methods for producing polymers, for example, for use in manufacturing toner, comprising, for example, aliphatic polyester block copolymers, such as, those comprising polycaprolactone (PCL) and/or polylactide (PLA), which are capped by reaction with a cyclic acid anhydride, for example, succinic anhydride, to prevent, "back biting," or chain degradation reactions of polymers containing propagating hydroxyl groups/ends by forming a free acid end. The reaction is one-pot, neat and occurs under standard pressure and ambient conditions.

In embodiments, a process is disclosed including polymerizing a first cyclic monomer with at least one catalyst and an optional at least one initiator to form a homopolymer; optionally polymerizing a carbonate monomer with the homopolymer to form a second block of a diblock copolymer; optionally polymerizing a second cyclic monomer to the homopolymer or to the second block of the diblock copolymer to form a second block of a block copolymer or a third block of a triblock copolymer, where the homopolymer, second block of the block copolymer or third block of the triblock copolymer comprises a propagating hydroxyl group at one end, and contacting the homopolymer, second block of the block copolymer or third block of the triblock copolymer with a cyclic acid anhydride to form a free acid at the end of the polymer, thereby end-capping the homopolymer, second block of the block copolymer or the third block of the triblock copolymer. In other embodiments, the first and second cyclic monomers are the same. The reaction occurs under neat conditions under standard pressure and humidity in a single vessel.

In embodiments, the cyclic acid anhydride comprises phthalic anhydride, trimellitic anhydride, maleic anhydride, hexahydrophthalic anhydride, glutaric anhydride, methylhexahydrophthalic anhydride, itaconic anhydride, methyltetrahydrophthalic anhydride, tetrahydrophthalic anhydride, tetrachlorophthalic anhydride, pyromellitic dianhydride, himic anhydride, succinic anhydride, tetrabromophthalic anhydride or dodecenylsuccinic anhydride.

BRIEF DESCRIPTION OF THE DRAWINGS

Various embodiments of the present disclosure will be described with reference to the figures listed below.

DETAILED DESCRIPTION

In this specification and the claims that follow, singular forms such as "a," "an," and, "the," include plural forms unless the content clearly dictates otherwise. All ranges disclosed herein include, unless specifically indicated, all endpoints and intermediate values.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and "matching," or grammatical variations thereof, have generally acceptable definitions or at the least, are understood to have the same meaning as, "about."

The term, "functional group," refers, for example, to a group of atoms arranged in a way that determines the chemical properties of the group and the molecule to which it is attached. Examples of functional groups include halogen atoms, hydroxyl groups, carboxylic acid groups and the like.

The term, "short-chain," refers, for example, to hydrocarbon chains in which the number of carbon atoms in the chain ranges from 1 to about 7, from about 2 to about 6, from about 3 to about 5.

The terms, "one or more," and, "at least one," refer, for example, to instances in which one of the subsequently described circumstances occurs, and to instances in which more than one of the subsequently described circumstances occurs.

The term, "neat," refers to conditions performed with a reagent with no standard or added solvent or cosolvent.

The term, "propagating hydroxyl group/ends," refers to a hydroxyl functionality at one end of a polymer that serves as a nucleus/center for further polymerization.

One skilled in the art will also readily recognize that where methods or compositions are disclosed, the invention encompasses not only such compositions or processes and other subcomponents or positive process steps, but may also exclude one or more components, subcomponents, functional groups, or steps therein, as used, for example, in an explicit negative limitation. The disclosure therefore envisages the explicit exclusion of any one or more components, subcomponents, functional groups, elements, species, or embodiments, including provisos that may apply to any of the disclosed embodiments, whereby any one or more components, subcomponents, elements, functional groups, species, or embodiments, may be excluded.

Figure 1:
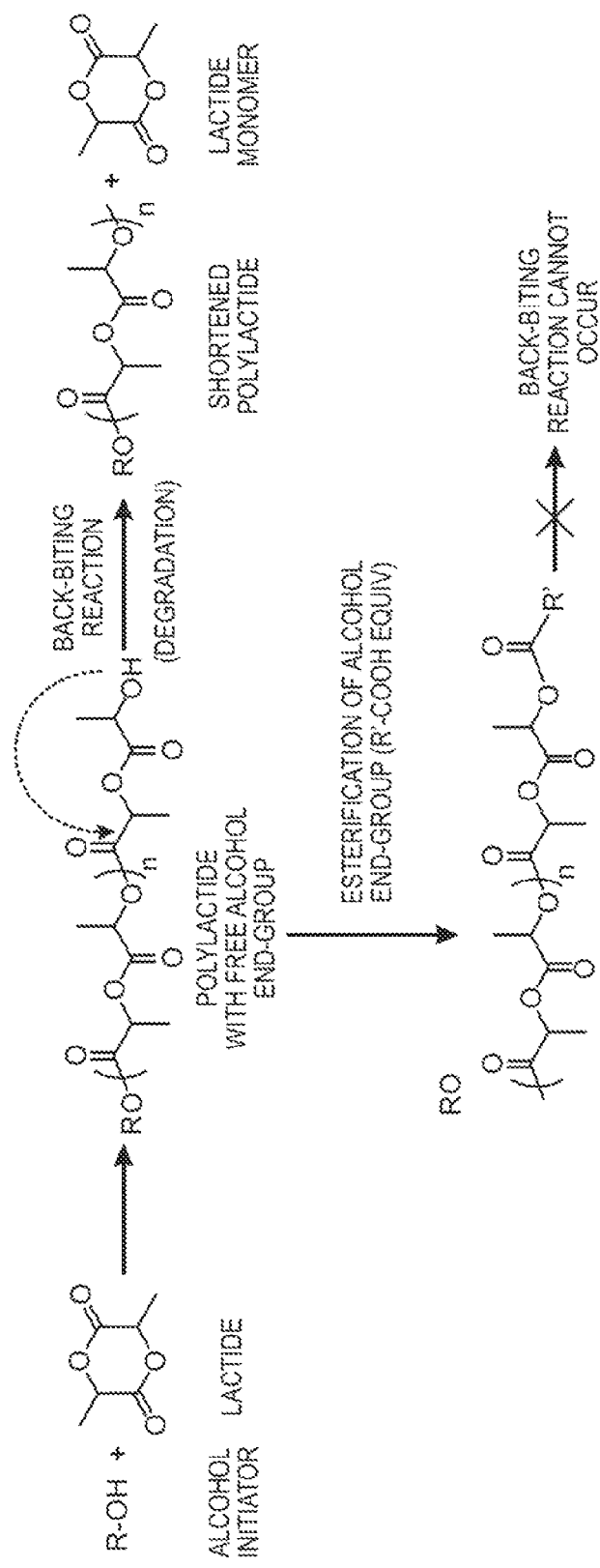
FIG. 1 illustrates a, "back biting," reaction of hydroxyl chain ends in PLA degradation.
Figure 2:
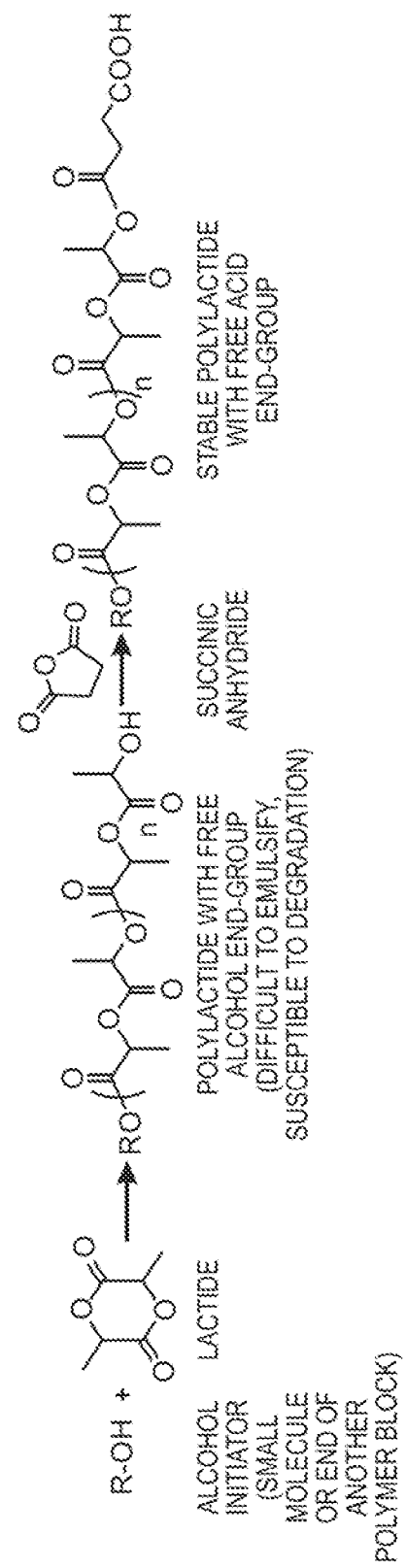
FIG. 2 illustrates succinic acid anhydride end-capping of a polymer with a PLA block.

Polymer or copolymer with a terminal hydroxyl group is susceptible to premature degradation through ring closing reactions initiated at the hydroxyl terminus. For example, mass spectral analysis of polylactic acid (PLA) frequently failed to reveal the presence of an PLA due to rapid in situ degradation. The phenomenon, known as, "back biting," (see FIG. 1), is facilitated by the stability of the lactide monomer (see, e.g., Peng et al. Polym Degrad Stab (2003) 80:141-147; Fran et al., Polym Degrad Stab (2004) 84:143-149; and Ma et al., Composites Sci Tech (2006) 66:2360-2366, each incorporated by reference in entirety).

Esterification of the chain end prevents the, "back biting," reaction from occurring, and increases hydrolytic stability. However, that further reduces the hydrophilicity of the polymer or copolymer, thereby potentially complicating later emulsification processes that depend on water-solubilizing groups to facilitate dispersion.

A process is disclosed for stabilizing free hydroxyl ends of a polymer or copolymer by reacting same with a cyclic acid anhydride to form a carboxylic acid. The hydroxyl group and anhydride react to form a free acid at the terminus, thereby capping the polymer and removing the terminal free hydroxyl from further reaction. The reaction also introduces an acid functionality which facilitates emulsification through an increase in acid number.

Treating the fully formed polymer with a cyclic acid anhydride (e.g., succinic anhydride) occurs in a one-pot, neat reaction. In embodiments, cyclic acid anhydrides include, but are not limited to, phthalic anhydride, trimellitic anhydride, maleic anhydride, hexahydrophthalic anhydride, glutaric anhydride, methylhexahydrophthalic anhydride, methyltetrahydrophthalic anhydride, tetrahydrophthalic anhydride, tetrachlorophthalic anhydride, pyromellitic dianhydride, himic anhydride, succinic anhydride, tetrabromophthalic anhydride, itaconic anhydride, dodecenylsuccinic anhydride, chlorendic anhydride and combinations thereof.

By way of example, a neat, one-pot ROP scheme was developed that enables volitional production of copolymers, such as, block copolymers of designed structure and function, depending on the monomers used and the reaction conditions. To facilitate self-aggregation or cross-linking, a copolymer can be configured to contain certain functional groups, and if needed, in a certain configuration. For example, nests or islands of carboxylic acid functional groups in polyesters stimulate self-aggregation between and among polymers. Monomers that yield a polymer residue with a carboxylic acid group include certain functionalized carbonates.

Thus, a first cyclic monomer is polymerized in the presence of at least one catalyst and an optional at least one initiator to form a homopolymer in a neat, one-pot reaction. Optionally, a carbonate monomer is polymerized to the homopolymer to form a first diblock copolymer. Either the homopolymer or diblock copolymer can be reacted with a second cyclic monomer to form a second diblock copolymer or a triblock copolymer. In embodiments, the second cyclic monomer can be one comprising a hydroxyl group which forms a reaction site for further reaction in the living polymerization scheme. In embodiments, such as polymer is reacted with a cyclic acid anhydride in the same vessel, under neat conditions to provide a free acid at the terminus thereby end-capping the propagating polymer.

Resins

The process of interest use neat conditions (i.e., no added solvent or cosolvent), in the absence of anhydrous conditions (e.g., may be conducted under ambient humidity, that is, without the need of humidity control and under normal laboratory conditions exposed to the ambient air), without an inert gas blanket or under pressure (e.g., may be conducted under standard pressure of 1 atmosphere or at normal laboratory conditions exposed to ambient air) to produce capped polymers and copolymers with high conversion and low polydispersity.

In embodiments, useful carbonates to provide carboxylic acid functionalities include, but are not limited to unsaturated carbonate monomers, symmetrical carbonate monomers, asymmetrical carbonate monomers, aliphatic carbonate monomers, cyclic carbonate monomers, aromatic carbonate monomers, aliphatic-aromatic carbonate monomers, alicyclic carbonate monomers, thio-carbonate monomers, imido-carbonate monomers, linear carbonate monomers, branched carbonate monomers, substituted carbonate monomers, functionalized carbonate monomers, and combinations thereof.

Figure 3:
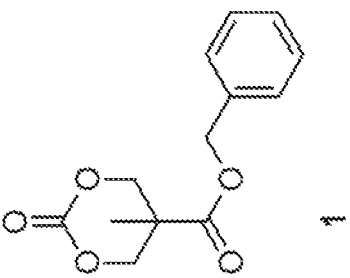
FIG. 3 shows the synthesis of functionalized carbonate monomer 1.
Figure 3:
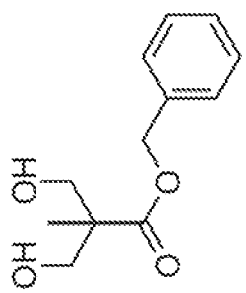
Figure 3:
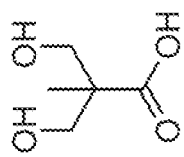

An example of a functionalized carbonate monomer 1 was synthesized in two steps from commercially available material and isolated in good yield (Pratt et al., J L Chem Comm (2008) 114-116, herein incorporated by reference in entirety), as depicted in FIG. 3.

The first and second cyclic monomers include monomers or dimers of aliphatic hydroxycarboxylic acids. Examples include, but are not limited to, lactide, glycolide, β-propiolactone, β-butyrolactone, γ-butyrolactone, γ-valerolactone, γ-valerolactone, ε-caprolactone and the like.

In the case of asymmetric carbon atoms within the hydroxy carboxylic acid unit, each of the D-form and the L-form as well as mixtures of both may be used. Racemic mixtures may also be used. By way of example, the D,D-lactide is the cyclic dimer made of two D-lactic acids, the L,L-lactide is the cyclic dimer made of two L-lactic acids, and the meso lactide is the dimer made of one D-lactic acid and one L-lactic acid. D,L-lactide designates a racemic mixture of D,D-lactide and L,L-lactide.

Cyclic components polymerizable by ROP include cyclic carbonates and 5-membered to 7-membered cyclic carbonates. In embodiments, cyclic components may include 4-(benzyloxymethyl)-1,3-dioxolan-2-one (BDMC) and 4-(hydroxymethyl)-1,3-dioxolan-2-one (DMCOH).

Other cyclic components may include cyclic anhydrides, epoxides, combinations thereof and the like. Suitable cyclic anhydrides include, but are not limited to, aliphatic dicarboxylic anhydrides, such as, succinic anhydride, glutaric anhydride, itaconic anhydride, maleic anhydride and combinations thereof. Examples of epoxides include styrene oxide, cyclohexene oxide, combination thereof and the like.

As noted above, in embodiments, the starting materials, such as, lactones, may be chosen such that one the formed blocks may be amorphous in nature, and the other may be crystalline. Examples of lactones that produce amorphous polyesters in ROP include 4-tert-butylcaprolactone, 4-phenylcaprolactone, 4-methylcaprolactone and isomers thereof, 3,5-dimethylcaprolactone and isomers thereof, 3-isochromanone, lactide, glycolide, 4-(sulfonatophenyl)caprolactone and cyclic anhydrides, such as, cyclopentane-1,2-dicarboxylic anhydride, cyclohexene-1,2-dicarboxylic anhydride and 2,3-bicyclo[2,2,2]octadicarboxylic anhydride. Examples of aromatic dicarboxylic anhydrides include phthalic anhydride, naphthalene-dicarboxylic anhydride, pyridine-dicarboxylic anhydride, thiophene-dicarboxylic anhydride, epoxides, such as, styrene oxide and derivatives thereof, cyclohexene oxide, combinations thereof, and the like.

The choice of monomers used in the reactions governs the composition, behavior, characteristics and properties of the resulting polymers and the blocks thereof as a design choice. Hence, particular monomers can be used, reaction times can be controlled and so on to obtain copolymers of the desired composition and properties. Lactide monomers yield amorphous blocks and caprolactone monomers yield crystalline blocks. As discussed above, a triblock copolymer can be product by performing ROP of caprolactone, adding a cyclic carbonate monomer to the reaction mixture to produce the functionalized carboxylic acid block and then adding a lactide monomer into the same pot to produce the triblock copolymer consisting of a crystalline segment, the functionalized acid segment and the amorphous segment in a single molecule. The order and length of the blocks is controlled by the selected use of a monomer at a particular time during construction process and controlling the length of the polymerization reactions during the formation of each block.

In embodiments, other starting materials beside carbonate monomers, lactones and lactides may be utilized to form copolymers. For example, the ROP of cyclic anhydrides, cyclic carbonates, epoxides, and combination thereof, may also be used to form copolymers of the present disclosure.

Catalysts

In embodiments, the ROP described above may take place in the presence of a catalyst, in embodiments, at least one catalyst. Catalysts which may be utilized include organic nucleophilic transesterification catalysts. In embodiments, the catalysts may mediate ROP by quasi-living polymerization mechanisms.

An organocatalyst or catalyst system can be used, for example, 4-(dimethylamino)pyridine (DMAP). Other organic molecules, such as, 4-pyrrolidinopyridine (PPY) and phosphines that promote ROP in the presence of a suitable nucleophilic initiator (see, e.g., Myers et al., J Polym Sci Part A: Polym Chem (2002) 40:844; Nederberg et al., Agnew Chem Int Ed (2001) 40:2712, and Biela et al., Makromol Chem (1983) 184:811, herein incorporated by reference in entirety).

In embodiments, such catalysts include 4-(dimethylamino) pyridine (DMAP)-DMAP:HX catalysts, where HX includes mineral acids such as HCl, HBr, sulfuric acid, nitric acid, phosphoric acid, or the like; organic acids, such as, formic acid, acetic acid, trifluoroacetic acid, trichloroacetic acid, triflic acid, or the like, or mixtures of combinations thereof. In embodiments, the catalyst is a two component organic transesterification system comprising DMAP and DMAP: $HO_3SCF_3$ (triflic acid).

The catalysts utilized to form the capped polymers or copolymers of the present disclosure should be able to operate at temperatures of from about 100° C. to about 170° C., from about 135° C. to about 165° C., from about 150° C. to about 160° C., although temperatures outside those ranges may be utilized.

In embodiments, the amount of catalyst, alone or in combination, utilized to catalyze a reaction may be from about 0.01% by weight to about 10% by weight based on the starting materials, from about 0.1% by weight to about 6% by weight based on the starting materials used to generate the copolymer polyester resin, although amounts outside those ranges may be utilized.

Initiators

In embodiments, the ROP may take place in the presence of an initiator, in embodiments, at least one initiator. Initiators include monohydric organic alcohols (i.e., monoalcohols).

In embodiments, such monoalcohols generally include organic alcohols having from 1 to about 40, from about 1 to about 18 carbon atoms, polymeric alcohols, or tetrafluoroethylene-based telomer alcohols. Examples of specific types of monoalcohols include the various aliphatic and aromatic alcohols, and the like, alcohols, such as, alkyl alcohols, for example, methyl alcohol, ethyl alcohol, propyl alcohol, hexanol and the like, olefinic alcohols, for example, allyl alcohol, and the like, alicyclic alcohols, for example, cyclohexanol, and the like, heterocyclic alcohols, for example, furfuryl alcohol, and the like. Various aromatic alcohols include benzyl alcohol and the like. Moreover, halogenated organic alcohols, such as, fluoroalcohols having from 2 to 18 carbon atoms, such as, trifluoroethanol, heptafluorobutanol, heptadecylfluorooctanol, and the like, may be used. In embodiments, monohydric alcohols include benzyl alcohol, trifluoroethanol, heptafluorobutanol, pentafluoropropanol, pentafluorobutanol, nonafluorhexanol, various perfluoroalkylethanols and allyl alcohol.

The monoalcohols should operate at temperatures of from about 100° C. to about 170° C., from about 135° C. to about 165° C., from about 150° C. to about 160° C., although temperatures outside those ranges may be utilized.

The amount of initiator(s) may be from about 0.01% by weight to about 10% by weight based on the starting materials, from about 0.1% by weight to about 6% by weight based on the starting materials used to generate the polymer or copolymer, although amounts outside those ranges may be utilized.

In embodiments, polyester polymers may be used as initiators, for example, the initiator may be polycaprolactone, polylactide or carbonate.

Reaction Conditions

In the polymerization process, the reactants are added to a suitable reactor, such as, a mixing vessel. The appropriate amount of a starting material or materials is added to a catalyst, and a polyester homopolymer or copolymer is formed. Subsequent addition of monomers dictates the composition of the resulting copolymer.

Formation of the blocks is sequential depending on the monomer used and the reaction conditions. For example, in embodiments, a catalyst and starting material may be utilized to form one of the blocks, the block allowed to form, followed by addition of the starting material utilized to form the second, third and successive blocks. The fully formed polyblock copolymer is then reacted with a cyclic acid anhydride to form a free acid end-cap on the hydroxyl chain end of the polymer.

The starting materials may be at a monomer catalyst/initiator ratio of from about 17:1 in mmoles to about 33:1 in mmoles, where the catalyst/initiator amount represents an aggregate amount, in the case of using a dual catalyst system, of three reagents (e.g., 0.28 mmoles DMAP [catalyst], 0.28 mmoles DMAP:$HO_3SCF_3$ [catalyst], and 0.28 mmoles benzyl alcohol [initiator]), from about 9:1 to about 20:1, although amounts outside those ranges may be used. The capping cyclic acid anhydride (CAA) may be at a catalyst/initiator (e.g., DMAP+DMSP:$HO_3SCF_3$+hexanol):CAA ratio from about 1:1 to about 2.5:1 in mmoles, from about 1.25:1 to about 2.25:1 in mmoles, from about 1.5:1 to about 2:1 in mmoles. Those ratios relate to the total amount of catalysts(s) and the total amount of initiator(s) in the reaction. However, ratios outside of those ranges can be used.

Essentially, at least about equimolar amounts of initiator to monomer can be used as one initiator molecule yields one polymer chain. As a design choice, an excess of initiator can be used.

The time for the reaction may depend on the type and amount of starting materials utilized, the amount of catalyst utilized, the temperature of the reaction and the like. In embodiments, the reaction mixture may be mixed for from about 1 minute to about 72 hours, from about 10 minutes to about 24 hours (although times outside those ranges can be used), while keeping the temperature within the operational range of the catalyst being used, from about 100° C. to about 135° C., from about 135° C. to about 150° C., from about 150° C. to about 165° C., although temperatures outside those ranges may be used. The capping reaction may be about 3 to about 10 minute, about 2 to about 5 minutes.

Those skilled in the art will recognize that optimization of reaction conditions, temperature, initiator loading, reaction time and catalyst loading may be varied to generate polymers of various molecular weight, and that structurally related starting materials may be polymerized using comparable techniques.

The final copolymer can be used in any known uses and material employing a polyester, such as, adhesives, sheeting material, clothing material, fabrics, cushioning, insulation, containers, roping, applications using fibers and so on. In embodiments, a copolymer of interest may be utilized to form toner particles.

Toner

The capped polymer or copolymer resin described above may be utilized to form toner compositions. Toner compositions of the present disclosure may also include optional colorants, additional resins, waxes and other additives. Toners may be formed utilizing any method within the purview of those skilled in the art.

Surfactants

In embodiments, colorants, waxes, and other additives utilized to form toner compositions may be in dispersions including surfactants. Moreover, toner particles may be formed by emulsion aggregation methods where the copolymer resin described above and other components of the toner are placed in one or more surfactants, an emulsion is formed, toner particles are aggregated, coalesced, optionally washed and dried, and recovered.

One, two or more surfactants may be utilized. The surfactants may be selected from ionic surfactants and nonionic surfactants. Anionic surfactants and cationic surfactants are encompassed by the term, "ionic surfactants." In embodiments, the surfactant may be utilized so that it is present in an amount of from about 0.01% to about 5% by weight of the tone composition, from about 0.75% to about 4% by weight of the tone composition, from about 1% to about 3% by weight of the tone composition, although amounts outside those ranges may be utilized.

Examples of nonionic surfactants that may be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210M, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block co-polymer of polyethylene oxide and polypropylene oxide, including those commercially available as SYNPERONIC PE/F, such as, SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN®, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical company, and/or TAYCA POWER BN2060 from Tayca Corporation (Japan), which are branched sodium dodecyl benzene sulfonates. Combinations of the surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, 0 to about 35 percent by weight of the toner, from about 1 to about 15 weight percent of the toner, from about 3 to about 10 percent by weight of the toner, although amounts outside those ranges may be utilized.

As examples of suitable colorants, mention may be made of carbon black like REGAL 330™, magnetites, such as, Mobay magnetites MO8029™, MO8060™, Columbian magnetites; MAPICO BLACKS™ and surface-treated magnetites; Pfizer magnetites CB4799™, CB5300™, CB5600™, MCX6369™; Bayer magnetites, BAYFERROX 8600™, 8610™, Northern Pigments magnetites, NP-604™, NP-608™, Magnox magnetites TMB-100™, or TMB- 104™; and the like. As colored pigments, there can be selected cyan, magenta, yellow, red, green, brown, blue or mixtures thereof.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19 and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, Anthrathrene Blue, identified in the Color Index as CI 69810, Special Blue X-2137 and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as, mixtures of MAPICO BLACK™, and cyan components may also be selected as colorants. Other known colorants may be selected, such as, Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine REd (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Doniniom Color Company), Royal Brilliant Red RD-8192 (Paul Uhlich), Oracer Pink RF (Ciba-Geigy), Paliogen Red 3871K (BASF), Paliogen Red 3340 (BASF), Lithol Fast Scarlet L4300 (BASF), combinations thereof and the like.

Wax

Optionally, a wax may also be combined with the resin and a colorant in forming toner particles. When included, the wax may be present in an amount of, for example, from about 1 weight percent to about 25 weight percent of the toner particles, from about 5 weight percent to about 20 weight percent of the toner particles, although amounts outside those ranges may be utilized.

Waxes that may be selected include waxes having, for example, a weight average molecular weight of from about 500 to about 20,000, from about 1,000 to about 10,000, although weights outside those ranges may be utilized.

Waxes that may be used include, for example, polyolefins such as polyethylene, polypropylene, and polybutene waxes, such as, commercially available from Allied Chemical and Petrolite Corporation, for example POLYWAX™ polyethylene waxes from Baker Petrolite, wax emulsions available from Michaelman, Inc. and the Daniels Products company, EPOLENE N-15™ commercially available from Eastman Chemical Products, Inc., and VISCOL 550-P™, a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax, and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate and pentaerythritol tetra behenate; ester waxes obtained from higher fatty acid and multivalent alcohol multimers, such as, diethyleneglycol monostearate, dispropyleneglycol distearate, diglyceryl distearate, and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example, MICROSPERSION 19™ also available from Micro Powder Inc., imides, esters, quaternary amines, carboxylic acids or acrylic polymer emulsion, for example, JONCRYL 74™, 89™, 130™, 537™, and 538™, all available from SC Johnson Wax, and chlorinated polypropylenes and polyethylenes available from Allied Chemical, Petrolite Corporation and SC Johnson Wax. Mixtures and combinations of the foregoing waxes may also be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation (EA) processes, any suitable method of preparing toner particles may be used, including chemical processes, such as suspension and encapsulation processes disclosed in U.S. Pat. Nos. 5,290,654 and 5,302,486, the disclosure of each of which hereby is incorporated by reference in entirety.

Toner compositions may be prepared by EA processes, such as, a process that includes aggregating a mixture of an optional colorant, an optional wax and any other desired or required additives, and emulsions including the capped resins described above, optionally in surfactants as described above, and then coalescing the aggregate mixture. A mixture may be prepared by adding an optional colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 4 to about 5, although a pH outside that range may be utilized. Additionally, in embodiments, the mixture may be homogenized. If the mixture is homogenized, homogenization may be accomplished by mixing at about 600 to about 4,000 revolutions per minute, although speeds outside this range may be utilized. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, from about 0.2% to about 5% by weight, from about 0.5% to about 5% by weight, of the resin in the mixture, although amounts outside those ranges may be utilized.

In embodiments, the aggregating agent may be metered into the mixture over time. For example, the agent may be metered into the mixture over a period of from about 5 to about 240 minutes, from about 30 to about 200 minutes, although more or less time may be used as desired or required. The addition of the agent may also be done while the mixture is maintained under stirred conditions, from about 50 rpm to about 1,000 rpm, from about 100 rpm to about 500 rpm (although speeds outside those ranges may be utilized), and at a temperature that is below the glass transition temperature of the resin, in embodiments, from about 20° C. to about 90° C., from about 35° C. to about 70° C., although temperatures outside those ranges may be utilized.

After aggregation and once the desired final size of the toner particles is achieved, the pH of the mixture may be adjusted with a base or a buffer to a value of from about 3 to about 10, from about 5 to about 9, although pH outside those ranges may be utilized. The adjustment of the pH may be utilized to freeze, that is to stop, toner growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

In embodiments, a resin as taught herein or as known in the art can be added to the particles to form a shell thereover.

The particles may then be coalesced to the desired final shape, the coalescence being achieved by, for example, heating the mixture to a temperature of from about 65° C. to about 105° C., from about 70° C. to about 95° C. (although temperatures outside those ranges may be utilized), which may be at or above the glass transition temperature of the resin, and/or increasing the stirring, for example to from about 400 rpm to about 1,000 rpm, from about 500 rpm to about 800 rpm, although speeds outside those ranges may be utilized. Higher or lower temperatures may be used, it being understood that the temperature is a function of the resins used for the binder. Coalescence may be accomplished over a period of from about 0.1 to about 9 hours, from about 0.5 to about 4 hours, although times outside those ranges may be utilized.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may contain optional additives, as desired or required. For example, the toner may include positive or negative charge control agents, for example, in an amount of from about 0.1 to about 10 percent by weight of the toner, from about 1 to about 3 percent by weight of the toner, although amounts outside those ranges may be utilized. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in entirety; organic sulfate and sulfonate compositions, including those disclosed in U.S. Pat. No. 4,338,390, the disclosure of which is hereby incorporated by reference in entirety; cetyl pyridinium tetrafluoroborates; distearly dimethyl ammonium methyl sulfate; aluminum slats, such as, BONTRON E84™ or E88™ (Hodogaya Chemical); combinations thereof, and the like. such charge control agents may be applied simultaneously with the shell resin described above or after application of the shell resin.

There may also be blended with the toner particles external additive particles including flow aid additives, which additives may be present on the surface of the toner particles. Examples of additives include metal oxides, such as, titanium oxide, silicon oxide, tin oxide, mixtures thereof and the like; colloidal and amorphous silicas, such as, AEROSIL®, metal salts and metal salts of fatty acids inclusive of zinc stearate, aluminum oxides, cerium oxides and mixtures thereof. Each of the external additives may be present in an amount of from about 0.1% by weight to about 5% by weight of the toner, from about 0.25% by weight to about 3% by weight of the toner, although amounts outside those ranges may be utilized. Suitable additives include those disclosed in U.S. Pat. Nos. 3,590,000, 3,800,588, and 6,214,507, the disclosure of each of which hereby is incorporated by reference in entirety.

Developers

The toner particles may be formulated into a developer composition. The toner particles may be mixed with carrier particles to achieve a two-component developer composition. The toner concentration in the developer may be from about 1% to about 25% by weight of the total weight of the developer, from about 2% to about 15% by weight of the total weight of the developer, although amounts outside those ranges may be utilized.

Carriers

Examples of carrier particles include those that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers.

Various effective suitable means may be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 µm in size, from about 50 to about 75 µm in size (although sizes outside those ranges may be utilized), coated with about 0.5% to about 10% by weight, from about 0.7% to about 5% by weight (although amounts outside those ranges may be utilized), of a conductive polymer mixture including, for example, methylacrylate and carbon black using the process described in U.S. Pat. Nos. 5,236,629 and 5,330,874.

The carrier particles may be mixed with the toner particles in various suitable combinations. The concentrations may be from about 1% to about 20% by weight of the toner composition. However, different toner and carrier percentages may be used to achieve a developer composition with desired characteristics.

Imaging

The tones may be utilized for electrophotographic or xerographic processes, including those disclosed in U.S. Pat. No. 4,295,990, the disclosure of which is hereby incorporated by reference in entirety. In embodiments, any known type of image development system may be used in an image developing device, including, for example, magnetic brush development, jumping single-component development, hybrid scavengeless development (HSD), and the like. Those and similar development systems are within the purview of those skilled in the art.

The following Examples are being submitted to illustrate embodiments of the present disclosure. The Examples are intended to be illustrative only and are not intended to limit the scope of the present disclosure. Parts and percentages are by weight unless otherwise indicated. As used herein, "room temperature," refers to a temperature of from about 20° C. to about 25° C.

EXAMPLES

Example 1

Procedure for the Homopolymerization of Carbonate Monomer 1 (Degree of Polymerization (DP)=10)

To a 16×125 mm test tube equipped with a small magnetic stir bar were added DMAP (49 mg, 0.4 mmol, 1 eq), DMAP: $OH_3SCF_3$ (109 mg, 0.4 mmol, 0.1 eq), carbonate monomer 1 (FIG. 3) (1.0 g, 4.0 mmol, 1 eq), and hexanol (50 µl, 41 mg, 0.4 mmol, 0.1 eq). The mixture was heated in an oil bath to 135° C., stirring commenced on melting (~1 minute). Samples were taken throughout the polymerization reaction for GPC analysis and the results are presented in Table 1.

TABLE 1

GPC Analysis of Homopolymerized Carbonate Monomer 1.

| Time   | Mn   | Mw   | PDI  |
|--------|------|------|------|
| 1 min  | 1387 | 1473 | 1.06 |
| 2 min  | 1529 | 1683 | 1.10 |
| 3 min  | 1682 | 1877 | 1.11 |
| 4 min  | 1720 | 1934 | 1.12 |
| 5 min  | 1779 | 2025 | 1.13 |
| 10 min | 1939 | 2266 | 1.16 |
| 15 min | 1966 | 2306 | 1.17 |
| 20 min | 1953 | 2293 | 1.17 |

A steady increase in the Mn and Mw were observed while maintaining a low polydispersity demonstrating that the one-pot, neat system (which is operable with caprolactones and lactides) can be used for making a functional carbonate monomer 1 polymer.

[1] H-NMR of the resulting polymer showed a homopolymer was obtained which compared well with the literature (Al-Azemi & Bisht, Macromolecules (1999) 32:6536-6540, herein incorporated by reference in entirety), namely broadened peaks at 7.2, 5.1 and 1.2 ppm, proving that polymerization was successful.

Example 2

General Procedure for Polycaprolactone (PCL)(25)-polycarbonate (PCarb1)(5)-polyactide (PLA)(25) Triblock Copolymer To a 16×125 mm test rube equipped with a small magnetic stir bar were added DMAP (68 mg, 0.56 mmol, 0.04 eq), DMAP:$HO_3SCF_3$ (152 mg, 0.56 mmol, 0.4 eq), ε-caprolactone (PC, 1.60 g, 0.014 mol, 1 eq), and hexanol (70 µl, 57 mg, 0.56 mmol, 0.04 eq). The mixture was heated in an oil bath to 135° C. The first block was allowed to polymerize over 24 hours, at which time the benzyl-carboxy carbonate monomer 1 (Carb1, FIG. 3) (700 mg, 0.0028 mol, 0.2 eq) was added. The second block was allowed to polymerize for 5 minutes, after which time D,L-lactide (LA, 2.0 g, 0.014 mmol, 1 eq) was added. The third block was allowed to polymerize for 5 minutes and the resulting clear melt was poured onto aluminum foil and allowed to cool to room temperature. The organocatalytic approach to living ROP is done neat, with no need for elaborate glassware setup or inert gas blanket.

TABLE 2

GPC Analysis of Triblock Copolymer.

| Sample                  | Mn   | Mw   | PDI  |
|-------------------------|------|------|------|
| PCL mono-block          | 4583 | 5740 | 1.25 |
| PCL-PCarb1 di-block     | 5353 | 6238 | 1.16 |
| PCL-PCarb1-PLA tri-block| 5839 | 7268 | 1.24 |

GPC shows an increase in Mn and Mw on addition of each monomer while maintaining a low polydispersity (Table 2), confirming a living polymerization and formation of a tri-block copolymer. ¹H-NMR was obtained for the first block showing the PCL peak at 4.05 ppm as well as unreacted monomer at 4.2 ppm. On addition of the carbonate monomer 1, ¹H-NMR presented new peaks corresponding to the polymer of Carb1.

¹H-NMR was performed on the crude product and showed the presence of PCL, pCarb1 and PLA peaks. The GPC data revealed an increase in Mn and Mw on addition of carbonate 1 and lactide in the triblock copolymer, and the ¹H-NMR of the 2$^{nd}$ block revealed presence of the pCarb1 demonstrating incorporation of the functionalized monomer into the polymer chain.

Example 3

Preparation of a Succinic Anhydride-Capped PCL-pCarb1-PLA Triblock Copolymer

To a 20 ml vial equipped with a small magnetic stir bar were added DMAP (98 mg, 0.8 mmol, 0.02 eq), DMAP:HO$_3$SCF$_3$ (218 mg. 0.8 mmol, 0.02 eq), ε-caprolactone (4.60 g, 0.040 mol, 1 eq) and hexanol (100 µl, 82 mg, 0.08 mmol, 0.02 eq). The mixture was heated in an oil bath to 135° C. The first block was allowed to polymerize over 47 hours, at which time D,L-lactide (5.80 g, 0.040 mmol, 1 eq) was added. The third block was allowed to polymerize for 30 minutes. Succinic anhydride (160 mg, 0.0016 mol, 0.04 eq) was added to the vial and reacted for 5 minutes. The resulting clear melt was poured into an Erlenmeyer flask and allowed to cool to room temperature. To the crude solid was added methanol (70 ml) and the mixture was heated to reflux on a hot plate until no white precipitate was observed. The solution was then cooled in the freezer for 12 hours and the suspension was filtered and dried in vacuo to yield pure block copolymer (4.3 g) as a while solid.

¹H-NMR was performed on the purified capped product and showed integration of the succinic anhydride (2.7 ppm) at the hexanol (0.08 ppm) to be roughly 4:3, as expected. The GPC showed one peak with low PDI suggesting the ¹H-NMR peaks correspond to a single polymer chain.

It will be appreciated that various of the above-disclosed and other features and functions, or alternatives thereof, may be desirably combined into many other different systems or applications. Also various presently unforseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are incorporated by reference in entirety.

We claim:
1. A process comprising:
polymerizing a first cyclic component and an optional second cyclic component to form a homopolymer or a copolymer resin using a ring opening polymerization (ROP) process; and,
reacting a cyclic acid anhydride with a propagating terminal hydroxyl group of the homopolymer or copolymer with at least one catalyst and an optional initiator to form a free acid end group,
wherein the polymerizing and reacting occur under neat Conditions, and standard pressure and humidity, in a single vessel.

2. The process of claim 1, wherein the cyclic acid anhydride is selected from the group consisting of phthalic anhydride, trimellitic anhydride, maleic anhydride, hexahydrophthalic anhydride, glutaric anhydride, itaconic anhydride, methylhexahydrophthalic anhydride, methyltetrahydrophthalic anhydride, tetrahydrophthalic anhydride, tetrachlorophthalic anhydride, pyromellitic dianhydride, humic anhydride, succinic anhydride, tetrabromophthalic anhydride, dodecenylsuccinic anhydride, and chlorendic anhydride.

3. The process of claim 1, wherein the at last one catalyst comprises two components of a nucleophilic transesterification system.

4. The process of claim 3, wherein the at least one catalyst comprises 4-(dimethylamino)pyridine (OMAP) and DMAP:HX, wherein FIX is selected from the group consisting of HCl, HBr, sulfuric acid, nitric acid, phosphoric acid, formic acid, acetic acid, trifluoroacetic acid, trichloroacetic acid, triflic acid, and combinations thereof.

5. The process of claim 4, wherein FIX comprises DMAP:HO$_3$SCF$_3$.

6. The process of claim 1, wherein the at least one optional initiator comprises a nonalcohol.

7. The process of claim 1, wherein the at least one optional initiator is selected from the group consisting of hexanol, methyl alcohol, ethyl alcohol, propyl alcohol, allyl alcohol, cyclo-hexanol, furfuryl alcohol, benzyl alcohol, trifluoroethanol, heptafluorobutanol, heptadecylfluorooctanol, pentafluoropropanol, pentafluorobutanol, nonafluorohexanol and a fluoroalkylethanol.

8. The process of claim 1, where said copolymer comprises a block copolymer.

9. The process of claim 8, wherein said block copolymer comprises a first and a second cyclic monomers selected from the group consisting of glycolide, β-propiolactone, β-butyrolactone, γ-butyrolactone, γ-valerolactone, ε-caprolactone, D,D-lactide, L,L-lactide, D,L-lactide, 4-(benzyloxymethyl)-1,3-dioxolan-2-one (BDMC), 4-(hydroxymethyl)-1,3-dioxolan-2-one (DMCOH), succinic anhydride, glutaric anhydride, maleic anhydride, styrene oxide, cyclohexene oxide, 4-(sulfonatophenyl)caprolactone, cyclopentane-1,2-dicarboxylic anhydride, cyclohexene 1,2-dicarboxylic anhydride, 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride and combinations thereof.

10. The process of claim 9, further comprising a third cyclic monomer.

11. The process of claim 10, wherein said third cyclic monomer comprises a carbonate selected from the group of organic monomers consisting of unsaturated carbonate monomers, symmetrical carbonate monomers, asymmetrical carbonate monomers, aliphatic carbonate monomers, cyclic carbonate monomers, aromatic carbonate monomers, aliphatic-aromatic carbonate monomers, alicyclic carbonate monomers, thio-carbonate monomers, imido-carbonate monomers, linear carbonate monomers, branched carbonate monomers, substituted carbonate monomers, functionalized carbonate monomers, and combinations thereof.

12. The process of claim 10, wherein said carbonate monomer comprises Formula (I):

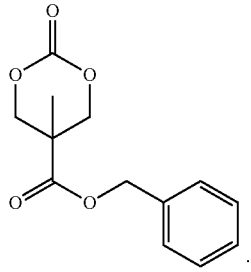

Formula (I)

13. A process comprising;
polymerizing as first cyclic, monomer with at least one catalyst and at least one optional initiator to form a homopolymer;
polymerizing a carbonate monomer to said homopolymer to form a second block of a diblock copolymer;
polymerizing a second cyclic component to said second block of the diblock copolymer to form a third block of a triblock copolymer, wherein said third block comprises a terminal propagating hydroxyl group; and
reacting a cyclic acid anhydride with said hydroxyl group to form a terminal free acid group, wherein the polymerizing and reacting steps are carried out under neat conditions in a single vessel under standard pressure and ambient humidity.

14. The process of claim 13, wherein said cyclic acid anhydride is selected from the group consisting of phthalic anhydride, trimellitic anhydride, maleic anhydride, hexahydrophthalic anhydride, glutaric anhydride, methylhexahydrophthalic anhydride, methyltetrahydrophthalic anhydride, tetrahydrophthalic anhydride, itaconic anhydride, tetrachlorophthalic anhydride, pyromellitic dianhydride, humic anhydride, succinic anhydride, tetrabromophthalic anhydride, dodecenylsuccinic anhydride and chlorendic anhydride.

15. The process of claim 13, wherein the first and second cyclic monomers, each is selected from the group consisting of glycolide, β-propiolactone, γ-butyrolactone, γ-butyrolactone, γ-valerolactone, ε-caprolactone, 4-(benzyloxymethyl)-1,3-dioxolan-2-one (BDMC), 4-(hydroxymethyl)-1,3-dioxolan-2-one (DMCOH), succinic anhydride, itaconic anhydride, glutaric anhydride, maleic anhydride, styrene oxide, cyclohexene oxide, 4-(sulfonatophenyl)caprolactone, cyclopentane-1,2-dicarboxylic anhydride, cyclohexene-1,2-dicarboxylic anhydride, 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride and combinations thereof.

16. The process of claim 13, wherein the first cyclic monomer comprises ε-caprolactone and said second cyclic comprises a lactide.

17. The process of claim 13, wherein the at least one catalyst comprises 4-(dimethylamino)pyridine (DMAP) and DMAP:HX, wherein HX is selected from the group consisting of HCl, HBr, sulfuric acid, nitric acid, phosphoric acid, formic acid, acetic acid, trifluoroacetic acid, trichloroacetic acid, triflic acid and combinations thereof.

18. The process of claim 13, wherein said carbonate monomer comprises Formula (I):

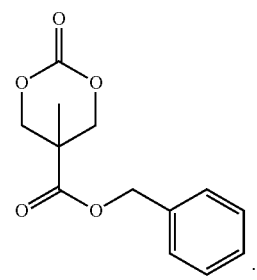

Formula (I)

19. The process of claim 13, wherein said at least one optional initiator comprises a monoalcohol.

20. The process of claim 13, wherein the at least one initiator is selected from the group consisting of hexanol, methyl alcohol, ethyl alcohol, propyl alcohol, allyl alcohol, cyclohexanol, furfuryl alcohol, benzyl alcohol, trifluoroethanol, heptafluorobutanol, heptadecylfluorooctanol, pentafluoropropanol, pentafluorobutanol, nonafluorohexanol and a fluoroalkylethanol.

* * * * *